Nov. 7, 1950 — H. P. RITSCH — 2,528,974
METHOD AND APPARATUS FOR CENTRIFUGAL SEPARATION
Filed Sept. 19, 1945 — 2 Sheets-Sheet 1
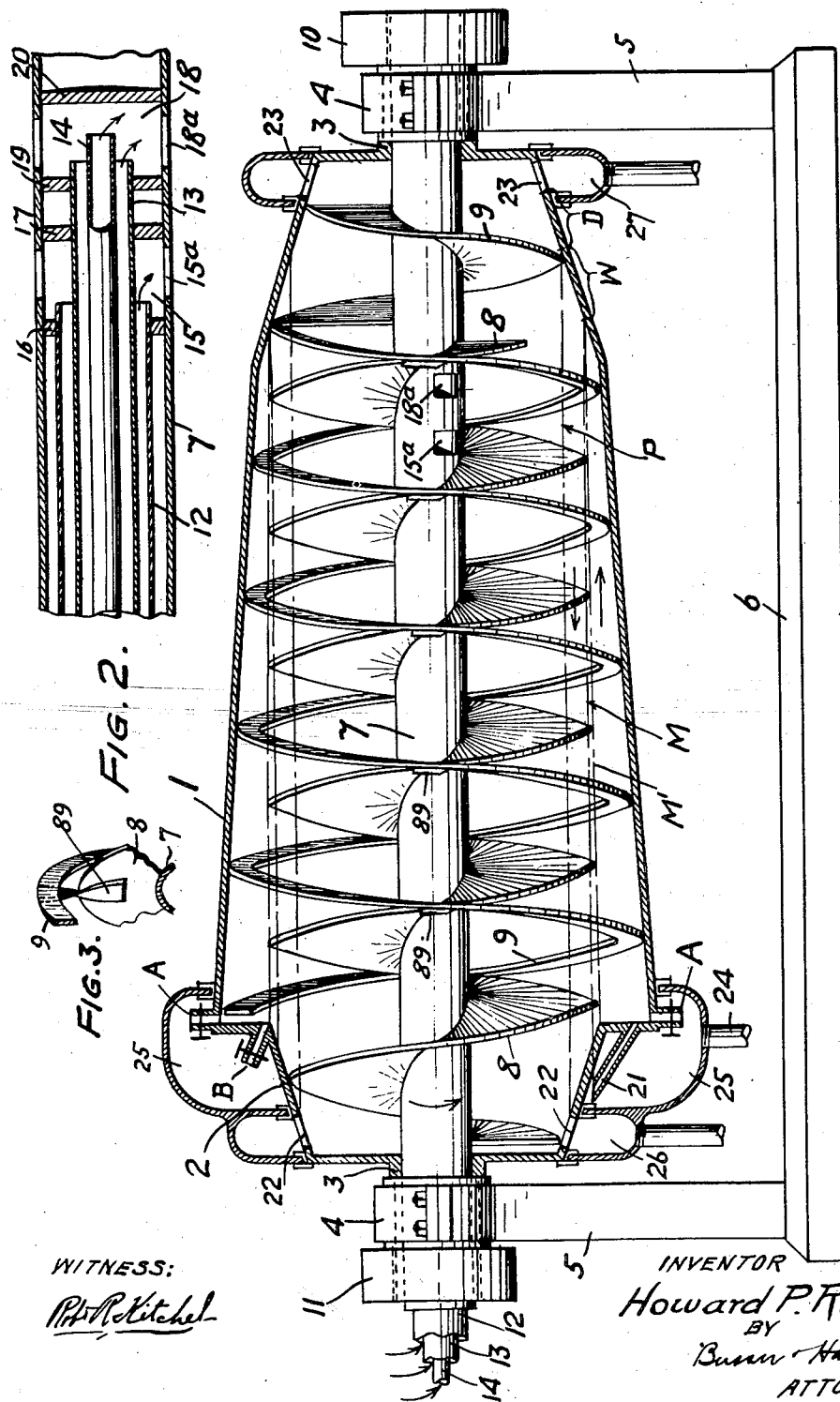
INVENTOR
Howard P. Ritsch
BY
Burr Harding
ATTORNEYS.

Nov. 7, 1950 H. P. RITSCH 2,528,974
METHOD AND APPARATUS FOR CENTRIFUGAL SEPARATION
Filed Sept. 19, 1945 2 Sheets-Sheet 2

WITNESS:

INVENTOR
Howard P. Ritsch
BY
ATTORNEYS.

Patented Nov. 7, 1950

2,528,974

UNITED STATES PATENT OFFICE 2,528,974

METHOD AND APPARATUS FOR CENTRIFUGAL SEPARATION

Howard P. Ritsch, Chicago, Ill., assignor to Process Development Company, a corporation of Illinois Application September 19, 1945, Serial No. 617,200

13 Claims. (Cl. 233—7)

1

This invention relates to an improvement in the art of separating solids of different densities by means of a liquid medium of intermediate density, and media whereby the solids are separated.

In the "sink-float" method of separation as now practiced, there are two definite limitations.

First, it has not proved feasible to apply such methods on a large or commercial scale to particles smaller than $\frac{1}{32}$ of an inch.

Second, the maximum density which can be used as the point of separation by such methods is about 3.3, as water is the only medium in which solids are suspended and galena and ferrosilicon are the only solids being used at present on a large scale, except in the cleaning of coal. Another limiting factor is viscosity, which builds up rapidly after a certain concentration of solids in the fluid is reached. These limitations exclude separations not only of the precious metals but also of the greater number of base metal minerals.

One of the objects of this invention is the provision of a method and apparatus, whereby separations of particles down to 100 mesh or finer may be made.

Another object of this invention is the provision of a method and apparatus whereby minerals ranging in density down to those of the platinum group may be separated.

Another object of this invention is the provision of a method and means whereby the amount of medium required to carry out the separation of minerals has been greatly reduced so that it is possible to use certain desirable media which have heretofore been excluded by the cost of maintaining the large stock required, for a given hourly capacity.

Another object of this invention is the provision of a method and apparatus whereby the medium loss is reduced to a minimum.

Another object of this invention is to extend the range for separation of solid particles by virtue of specific gravities relative to that of the liquid suspension medium, by the provision of a medium which can be adjusted precisely to a tenth of a point throughout the entire range of densities of minerals, from the lightest to the heaviest, with the exception of the native precious metals, which are separated from other minerals but not from each other.

Another object of this invention is the provision of means by which, under centrifugal force, the rate of separation of minerals is greatly accelerated, thus reducing the size of the plant required as well as the amount of separation medium for a given capacity.

2

Another object of this invention is the provision of an apparatus which may be used for the separation of solids with "heavy media" currently in use on a commercial scale, as well as with some now commonly used only in laboratory tests because of the high cost of the constituents.

Another object of this invention is the provision of an apparatus whereby the lighter solids separated by the liquid medium are continuously discharged therefrom as well as the heavier solids within the medium.

Further objects of the invention and the manner in which they are obtained will appear from the following description of a preferred method and from one form of apparatus shown in the accompanying drawings in which:

Fig. 1 is a longitudinal sectional view of one form of separator in which the method can be carried out, Fig. 2 is a detailed sectional view of the shaft, disclosing the inlets to the separator;

Fig. 3 is a detail sectional view of a portion of the screws, showing one form of connection between the screws where they cross each other.

Figure 4:
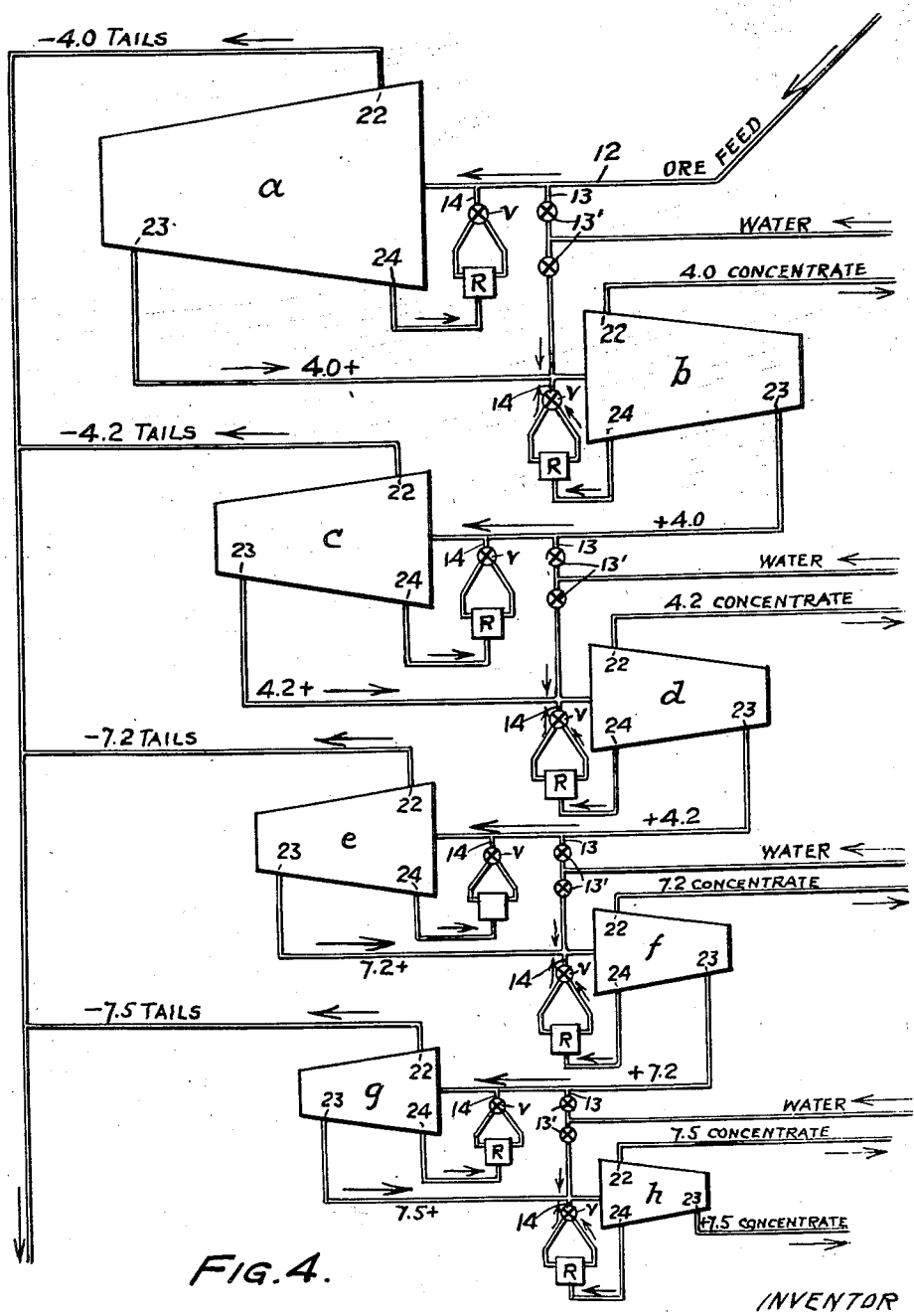
Fig. 4 is a diagram of a flow sheet illustrating eight separators arranged in series to produce five concentrates from a complex ore.

The separator illustrated in Fig. 1 comprises a shell 1 of truncated conical section, having a smaller truncated cone 2 extending from the larger end. Both ends of the shell are provided with heads from which hollow trunnions 3 extend which are rotably mounted in bearings 4, on standards 5, extending upwardly from a base 6.

Rotably mounted within the shell 1 is a compound screw conveyor having a hollow shaft 7, the ends of which are rotably mounted in the trunnions 3.

The conveyor comprises a solid screw member 8, arranged to feed material towards the left hand end of the shell 1, and is directly attached to the shaft 7 throughout its entire length, and a screw member 9 arranged to feed material towards the right hand end of the shell 1, as hereinafter described.

The screw 8 is substantially the same diameter throughout its length with the exception of a small portion at the left hand end thereof, which is tapered to rotate in the cone 2 and a very slight taper towards the right end of the shell, as hereinafter described, but does not extend to the right hand end of the shell 1.

A portion of the other screw 9 at the smaller end of the shell is connected to the shaft 7, while the major portion thereof is in the form of a narrow strip, which is connected to the outer edges of the screw 8 at the cross-over points of the screws by a strip 8a having a sharpened leading edge, and each half of the strip is bent to conform to the contour of the screw to which that half is attached.

The shaft 7 is provided with a pulley 10, while 11 indicates a pulley connected to one of the trunnions 3, to rotate the shell. This pulley 11 being somewhat smaller in diameter than pulley 10, so that when both pulleys are driven from the same power unit, the shell will be rotated in the same direction as the screw but somewhat faster. However, reduction means other than pulleys can be used to govern the speed of the screw relative to the shell or rotor.

Extending within the hollow shaft 7 are three concentric stationary pipes 12, 13 and 14. See Fig. 2. The pipe 12 terminates in a chamber 15, formed within the hollow shaft 7, between packing members 16 and 17, which form packed joints between shaft 7 and pipes 12 and 13, respectively. The pipes 13 and 14 terminate in a chamber 18 within the shaft 7 between a packing member 19, which forms a packed joint between pipe 13 and shaft 7, and a closure plate 20 in the hollow shaft.

Each of the chambers 15 and 18 communicate with the interior of the shell 1, by means of openings 15a and 18a respectively, through the wall of the shaft 7.

The pipe 12 is adapted to feed pulp to chamber 15, while pipes 13 and 14 feed clear water and the separating medium, respectively, to the chamber 18.

A, A, and B are valve controlled outlets from the shell for the separating medium, and 21 is another outlet for the separating medium which is adapted for maintaining a predetermined level of the separating medium in the shell.

22, 22 are outlet ports in the smaller truncated cone 2, for water and the lighter separated solids, and 23, 23 are similar ports at the other end of the shell 1, for solids heavier than the separating medium.

The method of separating mineral pulp by means of the apparatus disclosed in Fig. 1, is as follows:

The shell 1 and cone 2, are rotated at their normal speed, separating medium of a definite density is then fed through pipe 14, to chamber 18 and shell 1, until it overflows through outlet 21, while some of the medium is discharged through outlets A, A, and B, and the rate of feed must be such as to exceed the total flow from outlets A, A, and B, in order to provide a continuous overflow from outlet 21 and maintain the separating medium level at M.

After this level of the separating medium has been established, and while the medium is being continuously delivered to an outlet 24, from the annular receiving channel 25, for the overflow medium, back to the pipe 14, water is fed through pipe 13 and chamber 15 to the shell 1, to maintain an overflow through outlets 22, which determines the level P of pulp flow through the shell 1 and cone 2.

After the flow of water and medium has been properly adjusted, pulp properly diluted with water is fed through pipe 12 and chamber 15 to shell 1 and follows a spiral course determined by the pitch of the screw conveyor 8 which is rotated at a speed slightly less than the shell 1 and cone 2, and conveys all solids lighter than the separating medium, to and over the inner surface of cone 2, which is discharged through openings 22, into a receiving channel 26.

Solids heavier than the medium sink to the wall of shell 1, where they are conveyed inwardly by conveyor 9 (against centrifugal force) beyond the level M, through the clear water zone noted at W, and over the draining slope D to the discharge outlets 23, 23, from which the material is delivered to a receiving channel 27.

Annular channels 25, 26 and 27, and adjacent parts of the rotor, are provided with fins forming seals to prevent escape of fluids or solids at the points of juncture. The solids discharged from openings 22 and 23 are conveyed to proper receiving receptacles, as waste, or as a final product, or for further separation as later described, while the combined discharge of the separating medium from outlets A, A, B and 21 are rehomogenized and filtered, as conditions require, and are recirculated through the separator as before described.

It will be noted that the diameter of the screw 8, excepting that portion extending into cone 2, is such that it reaches slightly below the level M of the separating medium to the level M', while the outer diameter of the screw 9 is such as to substantially engage the inner wall of the shell 1, from end to end.

As above stated the screw 8 has a slight taper towards the right hand end of the shell 1, in order to convey any material which has settled below the surface M and above the surface M' so as to convey to outlets 22 any material above the inner edge of cone 2, which dips below surface M to surface M'. The latter is the upper limit of the medium of desired density, the slope of M' depending upon the settling rate of the heavier constituent of the medium. This settling rate can be predicted and controlled.

Standard automatic control devices may be employed to maintain the density of the separating medium within 0.02, by adding the required amounts of heavier or lighter constituents.

The medium which has proved most flexible in conjunction with this process is a stable suspension of mercury in carbon tetrachloride, any of several halogenated hydrocarbons or any liquid, of suitable viscosity, immiscible with water and of density greater than that of water. The mercury is preferably but not necessarily, in colloidal suspension, but the emulsion should be classified to eliminate all mercury globules above, say, 5 microns. By varying the proportions between mercury and the lighter liquid, the density of the medium can be continuously varied from 2.0 to 10.0, at which point the emulsion is rather viscous but penetrable by the heavy solids under centrifugal force as explained below.

Being a mixture of two liquids, rather than of a liquid and a solid, it is possible to use a much larger proportion of the heavier constituent without causing excessive viscosity. Under centrifugal force, however, it is possible to use much more viscous fluids than could be used in the present "sink-float" plants, relying upon the force of gravity alone. In fact, in certain cases, a moderately high viscosity is desirable. These facts, together with the high specific gravity of mercury, account for the very high densities of medium obtainable and the wide range of separations possible, employing the apparatus and method herein described.

This emulsion of mercury and heavy organic liquid can be generated (and regenerated as may be required) by various means, such as by ultrasonic equipment or, when the more viscous liquids are used, by ordinary homogenization, in either case with the addition of a stabilizer. A preferred method of regeneration which automatically cleans the medium of all suspended solids is rapid condensation of mercury vapor in a cooled bath of the organic liquid, the two liquids being distilled together under partial vacuum.

It is understood that the manner of generating the medium shall in no way limit the scope of this invention, nor shall the liquids employed be limited to those specifically mentioned. For instance, Wood's metal may, under some circumstances, be used to advantage in place of mercury, and if used above the melting point (about 72° C.), the suspension can be considered an emulsion and a novel medium within the meaning here intended.

It is understood further that media other than a suspension of mercury or other liquid metal in a heavy organic liquid can be employed to advantage in this apparatus and for carrying out the process. For example, solids much heavier than those in current use, such as tungsten or ferrotungsten, can be suspended in the organic liquid, as the objection of cost (from the standpoint of present sink-float practice) is overcome by the smaller quantity required, and the objection of higher viscosity is overcome by the greatly increased settling rate of pulp solids under centrifugal force.

The flow sheet here illustrated in Fig. 4 shows eight separators, $a$, $b$, $c$, $d$, $e$, $f$, $g$, and $h$, arranged in series to produce five concentrates from a complex ore, such as copper lead-zinc-gold-silver ore, containing desired minerals of densities: 4.0, 4.2, 7.2, 7.5, and gold and silver minerals heavier than 7.5, by subjecting them to the separating medium of different densities.

These separators $a$ to $h$ are of the same construction and are arranged to be rotated as the structure shown in Fig. 1, and are also provided with the inlets and outlets such as shown in Fig. 1, and operate in the same manner, to carry out stage separation. The various inlets and outlets to and from the separators $a$, $b$, $c$, $d$, $e$, $f$, $g$, and $h$, shown on Fig. 4, have been designated by the same reference characters as shown on Fig. 1.

The outlet 24 from each separator for the continuous flow of the medium through the separator, is connected to a combined filter and regenerator R, which is in turn connected to the pipe 14, for returning the filtered and regenerated medium at the density required for the separation done in the different separators, $a$ to $h$.

Each pipe 14 is provided with a valve V for adjusting the flow of the medium through the separator.

Each water inlet pipe 13 is provided with a valve 13' for controlling the flow of water through the separator.

In the system illustrated the separators $a$ to $h$ are set into motion at the required speed, and the medium at the proper density is delivered to each separator to cause a continuous flow therethrough as described in connection with the separation done in the separator shown in Fig. 1.

After the flow of medium and water in the series of separators has been adjusted, ore is delivered to separator $a$ and −4.0 tails are passed out through outlet 22 from separator $a$ to a collecting source for the reception for all tails from the system, while the heavier material 4.0+ is passed out through outlet 23 to separator $b$, in which a 4.0 concentrate is separated and passed through pipe 22 from separator $b$ while the heavier material +4.0 is passed through outlet 23 from separator $b$ to separator $c$, which concludes the first stage in the separation of a complex ore into concentrates 4.0; 4.2; 7.2; 7.5 and +7.5.

The particular system disclosed in Fig. 4 comprises four two-step stages for separating the ore delivered to separator $a$, into five concentrates, in which separators $a$ and $b$ form the first stage, $c$ and $d$ form the second stage, $e$ and $f$ the third stage and $g$ and $h$ the fourth stage.

Tails are separated from the ore in each of the separators $a$, $c$, $e$ and $g$, while the heavier material passing through the medium in separators $a$, $c$, $e$, and $g$ are delivered to separators $b$, $d$, $f$ and $h$, respectively, and concentrates, 4.0; 4.2; 7.2, are delivered from separators $b$, $d$, $f$ respectively, and as separator $h$ is the second separator in the last stage, concentrates 7.5 and +7.5 are delivered from separator $h$. The concentrate 7.5 which was floated off in separator $h$ may be sent on as a middling for still further separation, or if it contains no great or harmful amount of undesirable minerals and contains sufficient value in precious metals, it becomes a concentrate of the metals therein.

The separation stages shown can, of course, be carried out in different orders. Normally, the first separation should eliminate as much bulk as possible, and the units can be of successively smaller capacity.

Because of the simplicity and permanence of adjustments possible by this method, and the automatic controls by which one man can tend the entire series of units, the addition of one or two units to produce another concentrate involves scarcely more operating cost than that of the power required. Consequently, minerals which would otherwise be discarded can by this process be saved at an additional profit.

This flow sheet, which provides for "sharp cuts" at each density, producing high grade concentrate, can be further simplified by elimination of one or more units in case a middling product between two minerals of nearly the same density can be added to one of the concentrates without undesirably lowering the grade.

It will be obvious that one of the outstanding advantages of this method of mineral separation is that it is independent of the chemical or physical nature of the minerals, such as coatings or relative shapes and sizes of particles, with none of the constant checks and manual controls which must be maintained in other gravity methods, or particularly in flotation, where even a change in pH, temperature or dilution of the pulp feed can seriously affect the grade of concentrate.

No adjustments are necessary with changes in feed, except to "cut in" or "cut out" certain concentrates as desired, which calls for the simple adjustment of medium density for one or two units, or by-passing one or more units.

Total operating cost, including labor, power, reagent loss, replacements and depreciation, is low. The ratio of concentration is high, concentrates are "clean," it is not necessary to separate sands and fines nor otherwise to classify the ore (except to the extent required for grinding efficiency), and in many cases a good separation can be made at a much coarser grind than is possible with other methods. On the other hand, ores can be handled which require very fine grinding to liberate the minerals, and in the case of many complex ores, minerals which would otherwise be sent to the dump can be recovered profitably.

The advantages of this invention result from the provision of media in which the density can be varied over a wide range in accordance with the solids to be separated, thus permitting stage separation whereby solids of different densities may be separated at different stages.

Another advantage results from the provision of a method and apparatus for separating solids, in which the lighter of the solids are moved in one direction over a separating medium, which is continuously renewed, and beyond the separating medium in a washing liquid, whereby the medium is washed and drained from the lighter solids, while the heavier solids are moved in the reverse direction through the washing liquid and drained beyond the washing liquid.

Another advantage in the case of most media whose use is made feasible by this process, results from the sharp line of division between the medium and pulp flow, whereby it is not necessary for the float minerals to enter the medium, which greatly minimizes the necessity for washing the float minerals to recover the seperating medium. In the case of separations of very finely comminuted solids, a subsequent washing stage is sometimes necessary, but effective means have been developed for removing substantially all medium from both light and heavy fractions.

It should be pointed out that, whereas in current sink-float procedure it is necessary to introduce all of the pulp solids below the surface of the medium, to prevent "rafting" of the solids on the surface, which would interfere with stratification and separation, it is possible by the method and apparatus herein described to flow the pulp over the surface of the medium, rafting being prevented by the relatively high velocity of pulp flow in its spiral course, the rippling action at the surface of medium, and the propulsion by the screw 8, all of which actions keep the solid particles sufficiently agitated to permit stratification, yet not so strongly agitated as to interfere with the radial subsidence of the heavier solids under centrifugal force.

It will be evident that other stage separating methods may be carried out by the method disclosed than the specific method described and illustrated, as the heavier fraction may be rejected in the first step as tails and withdraw the heavier fractions in the second step as a concentrate.

It will also be evident that numerous variations of the invention may be made without departing from the principles thereof, as defined in the appended claims.

What I claim and desire to protect by Letters Patent is:

1. A centrifugal separator for separating granular solids comprising a shell of general cylindrical form, having tapered end portions, a hollow trunnion on each end mounted for rotation, an inlet communicating with a source of supply for continuously feeding pulp comprising solid granules and a liquid carrier into the shell, an inlet communicating with a source of supply for continuously feeding a separating medium into the shell of greater density than some of the granules and of less density than other granules, an overflow outlet for maintaining a constant level of medium in the shell, a second overflow outlet for maintaining a constant level of the carrier over the medium, a pulley connected to one of the trunnions for rotating the shell to maintain the separating medium together with the denser granules in an outer annular layer while the less dense granules are maintained in an inner annular layer of the carrier, there being a discharge opening for granules in each tapered end portion of the shell, a worm for feeding the outer layer of denser granules in the medium from under the carrier to the opening in one end of the shell, and a second worm to which the first worm is connected for feeding the inner layer of less dense granules within the carrier over the denser granules in the medium to the opening in the other end of the shell without disturbing the medium.

2. A centrifugal separator for separating granular solids, comprising a shell of general cylindrical form having tapered end portions, a hollow trunnion extending from each end of the shell mounted for rotation about a horizontal axis, a pulley connected to one of the trunnions for rotating said shell, a hollow shaft mounted for rotation in the trunnions, a pipe for continuously delivering a separating medium to the shell through the hollow shaft, an outlet from the shell for maintaining an annulus of the medium having a constant inner diameter during the rotation of the shell, a pipe for continuously delivering pulp and a carrier to the shell, an outlet from the shell for maintaining an annulus of the carrier within the annulus of the medium having a constant diameter during the rotation of the shell, an outlet in one tapered end of the shell for the denser granules, an outlet in the other end of the shell for the less dense granules, a conveyor carried by the shaft for moving the less dense granules in the annulus of the carrier in one direction from between the outlet for the denser granules and the point of the delivery of the pulp, a second conveyor carried by said first conveyor for removing the denser granules in the annulus of the medium in the reverse direction from the movement of the less dense granules from between the outlet for the less dense granules and the point of delivery of the pulp and a pulley on the shaft for rotating the shaft independent of the shell.

3. A centrifugal separator for separating granular solids, comprising a shell of general cylindrical form having tapered end portions, a hollow trunnion extending from each end of the shell mounted for rotation about a horizontal axis, a pulley connected to one of the trunnions for rotating said shell, a hollow shaft mounted for rotation in the trunnions, a pipe for continuously delivering a separating medium to the shell through the hollow shaft, an outlet from the shell for maintaining an annulus of the medium having a constant inner diameter during the rotation of the shell, a pipe for continuously delivering pulp and a carrier to the shell, an outlet from the shell for maintaining an annulus of the carrier within the annulus of the medium having a constant diameter during the rotation of the shell, an outlet in one tapered end of the shell for the denser granules, an outlet in the other end of the shell for the less dense granules, a worm carried by the shaft for moving the less dense granules in the annulus of the carrier in one direction from between the outlet for the denser granules and the point of the delivery of the pulp, a second worm carried by said shaft for removing the denser granules in the annulus of the medium in the reverse direction from the movement of the less dense granules from between the outlet for the less dense granules and the point of delivery of the pulp, a portion of the second worm overlying a portion of the first worm, one of said worms having a right hand pitch while the other has a left hand pitch and a pulley on the shaft for rotating the shaft independent of the shell.

4. A centrifugal separator for separating granular solids, comprising a shell of general cylindrical form having tapered end portions, a hollow trunnion extending from each end of the shell mounted for rotation about a horizontal axis, a pulley connected to one of the trunnions for rotating said shell, a hollow shaft mounted for rotation in the trunnions, a pipe for continuously delivering a separating medium to the shell through the hollow shaft, an outlet from the shell for maintaining an annulus of the medium having a constant inner diameter during the rotation of the shell, a pipe for continuously delivering pulp and a carrier to the shell, an outlet from the shell for maintaining an annulus of the carrier within the annulus of the medium having a constant diameter during the rotation of the shell, an outlet in one tapered end of the shell for the denser granules, an outlet in the other end of the shell for the less dense granules, a worm carried by the shaft for moving the less dense granules in the annulus of the carrier in one direction from between the outlet for the denser granules and the point of the delivery of the pulp, a second worm carried by said shaft for removing the denser granules in the annulus of the medium in the reverse direction from the movement of the less dense granules from between the outlet for the less dense granules and the point of delivery of the pulp, a portion of the second worm being formed of a helical strip secured to the periphery of the first worm at points where the strip crosses the periphery of the first worm and a pulley on the shaft for rotating the shaft independent of the shell.

5. A centrifugal separator for separating granular solids comprising a shell of general cylindrical form having a hollow trunnion at each end, bearings in which the trunnions are mounted, a driving member on one of the trunnions for driving the shell, a hollow member rotatably mounted in the shell having a member extending through one of the hollow trunnions, a driving member connected to the member extending through the trunnion, a tubular means for conducting solid granules and a liquid into the interior of the hollow member, openings through the wall of the said hollow member through which the granules and liquid are delivered between the shell and the hollow member, an outlet from the shell for maintaining the liquid at a predetermined level, an outlet for the denser separated material, an outlet for the less dense material, a conveyor secured to the outer face of the hollow member having a portion for moving the denser material to the outlet therefor and a second portion for moving the less dense material to the outlet therefor.

6. A centrifugal separator for separating granular solids comprising a shell of general cylindrical form having a hollow trunnion at each end, bearings in which the trunnions are mounted, a driving member on one of the trunnions for driving the shell, a hollow member rotatably mounted in the shell having a member extending through one of the hollow trunnions, a driving member connected to a member extending through the trunnion, tubular means for conducting solid granules and a liquid into the interior of the hollow member, openings through the wall of the said hollow member through which the granules and liquid are delivered between the shell and the hollow member, an outlet from the shell for maintaining the liquid at a predetermined level, an outlet for the denser separated material, an outlet for the less dense material and a worm secured to the outer face of the hollow member having a portion for moving the denser material to the outlet therefor and a second portion for moving the less dense material to the outlet therefor.

7. A centrifugal separator for separating granular solids comprising a shell of general cylindrical form having a hollow trunnion at each end, bearings in which the trunnions are mounted, a driving member on one of the trunnions for driving the shell, a hollow member rotatably mounted in the shell having a member extending through one of the hollow trunnions, a driving member connected to a member extending through the trunnion, tubular means for conducting solid granules and a liquid into the interior of the hollow member, a pipe for delivering a separating medium heavier than the liquid to the interior of the hollow member, an opening in the wall of the hollow member through which the medium is delivered to the shell, an outlet from the shell for maintaining the medium at a predetermined level, openings through the wall of the said hollow member through which the granules and liquid are delivered between the shell and the hollow member, an outlet from the shell for maintaining the liquid at a predetermined level, an outlet for the denser separated material, an outlet for the less dense material, a conveyor secured to the outer face of the hollow member having a portion for moving the denser material to the outlet therefor and a second portion for moving the less dense material to the outlet therefor.

8. A centrifugal separator for separating granular solids comprising a shell of general cylindrical form having a hollow trunnion at each end, bearings in which the trunnions are mounted, a driving member on one of the trunnions for driving the shell, a hollow member rotatably mounted in the shell having a member extending through one of the hollow trunnions, a driving member connected to a member extending through the trunnion, tubular means for conducting solid granules and a liquid into the interior of the hollow member, a pipe for delivering a separating medium heavier than the liquid to the interior of the hollow member, an opening in the wall of the hollow member through which the medium is delivered to the shell, an outlet from the shell for maintaining the medium at a predetermined level, openings through the wall of the said hollow member through which the granules and liquid are delivered between the shell and the hollow member, an outlet from the shell for maintaining the liquid at a predetermined level, an outlet at one end of the shell for the denser separated material, an outlet at the other end of the shell for the less dense material, a conveyor secured to the outer face of the hollow member having a portion for moving the denser material to the outlet therefor and a second portion for moving the less dense material to the outlet therefor.

9. A centrifugal separator for separating granular solids comprising a shell of general cylindrical form having a hollow trunnion at each end, bearings in which the trunnions are mounted, a driving member on one of the trunnions for driving the shell, a hollow member rotatably mounted in the shell having a member extending through one of the hollow trunnions, a driving member connected to a member extending through the trunnion, tubular means for conducting solid granules and a liquid into the interior of the hollow member, a pipe for delivering a separating medium heavier than the liquid to the interior of the hollow member, an opening in the wall of the hollow member through which the medium is delivered to the shell, an outlet from the shell for maintaining the medium at a predetermined level, openings through the wall of the said hollow member through which the granules and liquid are delivered between the shell and the hollow member, an outlet from the shell for maintaining the liquid at a predetermined level, an outlet at one end of the shell for the denser separated material, an outlet at the other end of the shell for the less dense material, a worm secured to the outer face of the hollow member having a portion for moving the less dense material to the outlet therefor at one end of the shell, a worm carried by the first worm for delivering the denser material to the outlet therefor at the other end of the shell.

10. A centrifugal separator for separating granular solids comprising a shell of general cylindrical form having a hollow trunnion at each end, bearings in which the trunnions are mounted, a driving member on one of the trunnions for driving the shell, a hollow shaft rotatably mounted in the trunnions, a driving member connected to one end of the shaft, a pipe for conducting solid granules and a liquid into the interior of the hollow shaft, openings through the wall of the said hollow shaft through which the granules and liquid are delivered to the shell, an outlet from the shell for maintaining the liquid at a predetermined level, a pipe for delivering a separating medium heavier than the liquid to the hollow shaft, an opening in the shaft through which the medium is delivered to the shell, an outlet from the shell for maintaining the medium at a predetermined level therein, an outlet for the less dense separated material, an outlet for the denser separated material and a worm secured to the outer face of the hollow shaft having a portion for skimming the less dense material from the top of the medium and conveying it to the outlet therefor and a second worm connected to the outer edges of the first worm for removing the denser material from the medium and conveying it to the outlet therefor.

11. A centrifugal separator for separating granular solids comprising a shell of general cylindrical form having a tapered end, a hollow trunnion at each end, bearings in which the trunnions are mounted, a driving member on one of the trunnions for driving the shell, a hollow shaft rotatably mounted in the trunnions, a driving member connected to one end of the shaft, a pipe for conducting solid granules and a liquid into the interior of the hollow shaft, openings through the wall of the said hollow shaft through which the granules and liquid are delivered to the shell, an outlet from the shell for maintaining the liquid at a predetermined level, a pipe for delivering a separating medium heavier than the liquid to the hollow shaft, an opening in the shaft through which the medium is delivered to the shell, an outlet from the shell for maintaining the medium at a predetermined level therein, an outlet for the less dense separated material, an outlet for the denser separated material nearer the axis of the shaft than the outlet for the less dense material, and a worm secured to the outer face of the hollow shaft having a portion for skimming the less dense material from the top of the medium and conveying it to the outlet therefor and a second worm connected to the outer edges of the first worm for removing the denser material from the medium and conveying it along the wall of the tapered end to the outlet therefor.

12. A centrifugal separator comprising a shell, having an outlet from each end thereof, a hollow trunnion extending from each end of the shell mounted for rotation, a pulley on one of the trunnions for rotating the shell, a pipe for continuously feeding a separating medium from a source of supply to an inlet to the shell, a pipe for continuously feeding mineral pulp to an inlet to the shell together with a liquid carrier from a source of supply, an overflow for maintaining a constant level of medium in the shell, a second overflow maintaining a constant level of the carrier over the medium, a shaft rotatably mounted in the trunnions, a conveyor connected to the shaft for continuously moving the lighter material within the carrier over the medium towards one outlet without disturbing the medium, and a second conveyor connected to the first conveyor for simultaneously moving the heavier material from under the carrier in the opposite direction towards the other outlet and a pulley on said shaft for rotating the shaft.

13. The method of separating complex ores into a plurality of concentrates of predetermined densities, comprising separating each desired concentrate from the least dense to the most dense in separate stages, each stage having two steps of separation for each predetermined concentrate, comprising producing and maintaining whirling annuli having an outer annulus of a medium of a definite depth and a predetermined density in each step, the density of the medium in each succeeding step being denser than that in the previous step, and an inner annulus of a carrier of a predetermined depth in each step, continuously feeding a medium to the annulus of the first step of the first stage while continuously feeding ore and a carrier to the annuli of the first step of the first stage, continuously removing the tails and the carrier from the first step of the first stage while continuously removing the denser solids from the annulus of the medium of the first step of the first stage while continuously removing the medium from said step, cleaning the medium and returning the medium to the step from which it was removed, continuously delivering said solids with a carrier to the second step of the first stage while continuously removing the carrier and the less dense solids as the first concentrate while continuously removing the denser solids from the second step of the first stage and delivering the said denser solids to the annuli of the first step of the second stage for removal of the tails with the carrier while continuously removing the medium from said step, cleaning the medium and returning the medium to the step from which it was removed while continuously delivering the solids from the first step of the second stage together with a carrier and medium to the second step of the second stage for the separation of the second concentrate from the solids delivered to the second step of the second stage and repeating the separating stages for each desired denser concentrate to be separated.

HOWARD P. RITSCH.

REFERENCES CITED

The following references are of record in the file of this patent:

UNITED STATES PATENTS

| Number | Name | Date |
|---|---|---|
| Re. 16,674 | Chance | July 12, 1927 |
| 1,067,410 | Du Pont | July 15, 1913 |
| 1,151,117 | Moxham | Aug. 24, 1915 |
| 1,158,949 | Beach | Nov. 2, 1915 |
| 1,232,104 | Sharpless | July 3, 1917 |
| 1,456,934 | Rice | May 29, 1923 |
| 1,749,057 | Armentrout | Mar. 4, 1930 |
| 1,873,185 | Clark | Aug. 23, 1932 |
| 1,909,159 | Ashmead | May 16, 1933 |
| 2,085,537 | Lyons | June 29, 1937 |
| 2,109,234 | Kennan | Feb. 22, 1938 |
| 2,184,598 | Jahn | Dec. 26, 1939 |
| 2,206,980 | Wade | June 9, 1940 |
| 2,271,501 | Scott | Jan. 27, 1942 |
| 2,353,152 | Erck | July 11, 1944 |

FOREIGN PATENTS

| Number | Country | Date |
|---|---|---|
| 533,027 | France | Feb. 17, 1922 |